United States Patent
Schmidt et al.

(10) Patent No.: US 11,884,017 B2
(45) Date of Patent: Jan. 30, 2024

(54) MATERIAL UNIT FOR AN ADDITIVE MANUFACTURING DEVICE

(71) Applicants: SIRONA DENTAL SYSTEMS GMBH, Bensheim (DE); DENTSPLY SIRONA inc., York, PA (US)

(72) Inventors: Christian Schmidt, Bensheim (DE); Thomas Hasenzahl, Darmstadt (DE); Michael Schwaiger, Vienna (AT); Markus Kuhnle, Hoflein an der Donau (AT); Andreas Ries, Darmstadt (DE); Torsten Richter, Darmstadt (DE)

(73) Assignee: DENTSPLY SIRONA INC., York, PA (US)

( * ) Notice: Subject to any disclaimer, the term of this patent is extended or adjusted under 35 U.S.C. 154(b) by 146 days.

(21) Appl. No.: 17/431,239

(22) PCT Filed: Feb. 25, 2020

(86) PCT No.: PCT/EP2020/054890
§ 371 (c)(1),
(2) Date: Aug. 16, 2021

(87) PCT Pub. No.: WO2020/173931
PCT Pub. Date: Sep. 3, 2020

(65) Prior Publication Data
US 2022/0134658 A1      May 5, 2022

(30) Foreign Application Priority Data

Feb. 28, 2019   (EP) ..................... 19160125

(51) Int. Cl.
*B29C 64/255*      (2017.01)
*B33Y 30/00*       (2015.01)
(Continued)

(52) U.S. Cl.
CPC .......... *B29C 64/255* (2017.08); *B29C 64/314* (2017.08); *B29C 64/343* (2017.08);
(Continued)

(58) Field of Classification Search
None
See application file for complete search history.

(56) References Cited

U.S. PATENT DOCUMENTS

2007/0075461 A1    4/2007  Hunter
2015/0210012 A1    7/2015  Zenere
2018/0244034 A1*   8/2018  Sutcliffe ............... B29C 64/255

FOREIGN PATENT DOCUMENTS

CN      104943164 A    9/2015
EP       3330062 A1    6/2018
(Continued)

OTHER PUBLICATIONS

International Search Report; PCT/EP2020/054890; Apr. 20, 2020 (filed); dated May 13, 2020.
(Continued)

*Primary Examiner* — Michael M. Robinson
(74) *Attorney, Agent, or Firm* — DENTSPLY SIRONA INC.

(57) ABSTRACT

Material unit for an additive manufacturing device (AM) having a resin vat, wherein the resin vat comprises a base which is transparent at least in sections, wherein the resin vat is connected to a holder for a reservoir, and wherein the holder is configured such that resin (R) emerging from an outlet of a reservoir held by said holder can flow into the resin vat.

22 Claims, 3 Drawing Sheets

(51) Int. Cl.
    *B33Y 50/00*    (2015.01)
    *B29C 64/314*   (2017.01)
    *B29C 64/343*   (2017.01)
    *B29C 64/386*   (2017.01)
    *B33Y 40/10*    (2020.01)
    *G01F 23/263*   (2022.01)

(52) U.S. Cl.
    CPC ............ *B29C 64/386* (2017.08); *B33Y 30/00* (2014.12); *B33Y 40/10* (2020.01); *B33Y 50/00* (2014.12); *G01F 23/263* (2013.01)

(56) References Cited

FOREIGN PATENT DOCUMENTS

| | | |
|---|---|---|
| WO | 2015015261 A1 | 2/2015 |
| WO | 2015092717 A1 | 6/2015 |

OTHER PUBLICATIONS

Written Opinion of the International Searching Authority; PCT/EP2020/054890; Apr. 20, 2020 (filed); dated May 13, 2020.
International Preliminary Report on Patentability; PCT/EP2020/054890; Apr. 20, 2020 (filed); dated May 13, 2020.

* cited by examiner

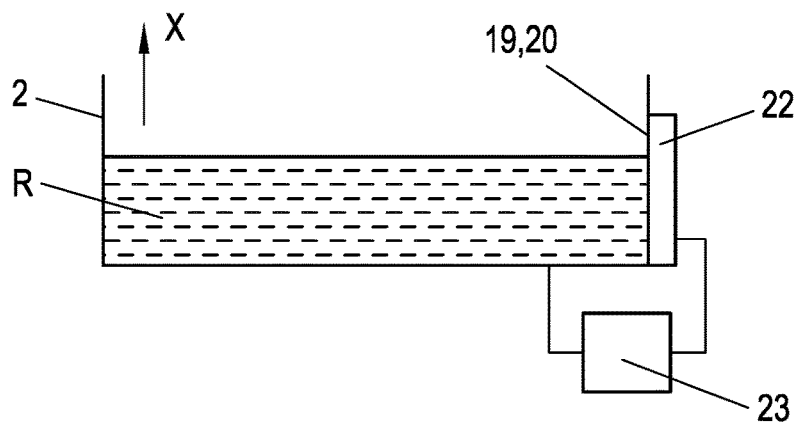
Fig. 6a
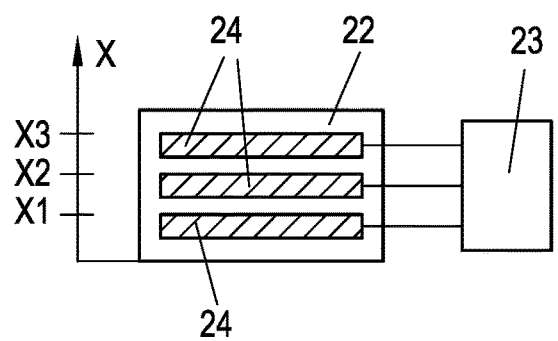
Fig. 6b
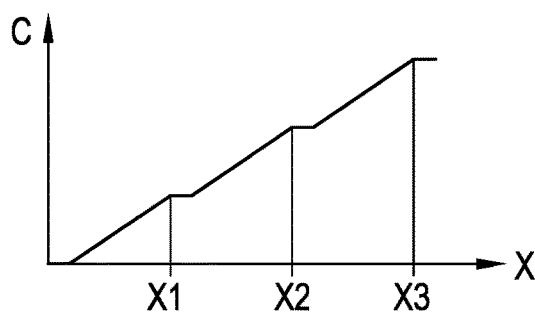
Fig. 6c
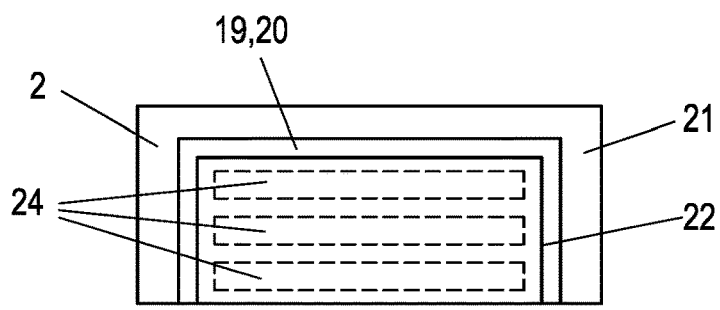
Fig. 6d
Fig. 6

MATERIAL UNIT FOR AN ADDITIVE MANUFACTURING DEVICE

CROSS-REFERENCE TO RELATED APPLICATIONS

This patent application is a National Phase application of International Application No. PCT/EP2020/054890 filed Feb. 25, 2020, which claims the benefit of and priority European Patent Application Number 19160125.1 filed on Feb. 28, 2019, which are herein incorporated by reference for all purposes.

TECHNICAL FIELD

The invention relates to a material unit for an additive manufacturing device. The invention further relates to a method for preparing an additive manufacturing device for the use of a printing material contained in a reservoir. The invention furthermore relates to a method for conditioning a resin using such a material unit.

BACKGROUND

Additive manufacturing devices, which include stereolithography machines and which comprise, among other things, a projection unit (e.g. DLP projector or laser), a height-adjustable build platform and a resin vat are known. The resin vat contains a material that can be cured by the projection unit via irradiation as a printing material. After a layer of the curable material has been formed on the build platform, the height of the build platform is adjusted in order to form a new material layer on the most recently formed material layer. In this way a component to be manufactured is formed layer-by-layer and is thus manufactured or made.

Classic stereolithography machines work according to a "top down" principle, in which the amount of curable material in the resin vat is generally sufficient for manufacturing a component with a maximum construction volume. In general, therefore, these types of machines do not have to be refilled during the manufacturing of the component, i.e. during the ongoing manufacturing process.

On the other hand, in particular for so-called table machines, "overhead printing" has gained acceptance, because it requires only a small filling volume of the resin vat. In the "bottom up" devices used for this purpose, the resin vat has to be filled only with the quantity of curable material for the component that is actually to be manufactured, or a slightly larger quantity. If the quantity of curable material in the resin vat is not sufficient, curable material is added during the ongoing manufacturing process. The additional metering is either performed manually or takes place automatically via an additionally connected reservoir.

For the dental scope of application, for example, a variety of indication-specific printing materials from different manufacturers are available to the user. It can be assumed that a specific, suitable curable material has to be used for each indication. In practice, for the user who wants to manufacture components for the dental scope of application, this means that the stereolithography machine may have to be changed over to a different printing material several times a day depending on the application. A changeover is complicated, however, because both the resin vat and the reservoir containing the printing material have to be handled. The user also has to be able to store the reusable printing materials in a UV-protected and odor proof manner.

SUMMARY

One objective of the invention is to create a material unit and a method as stated at the outset, which allows a simple and quick changeover of the additive manufacturing device for printing with a different printing material. The method specified at the outset for conditioning a resin is also intended to simplify the preparation of the additive manufacturing device for a printing.

For this purpose, the disclosure provides a material unit, and a method. Advantageous embodiments and further developments of the invention are also specified.

According to the invention, a material unit for an additive manufacturing device having a resin vat is provided, wherein the resin vat comprises a base (or bottom) which is transparent at least in sections, wherein the resin vat is connected to a holder for a reservoir, and wherein the holder is configured such that resin emerging from an outlet of a reservoir held by said holder can flow into the resin vat. The material unit thus comprises a resin vat, which is designed to accommodate a resin as the printing material. Within the framework of this description, a resin is any photoreactively curable material, i.e. regardless of its chemical composition, its aggregate state and, if applicable, its viscosity. The resin vat can consequently also be understood to be a material vat. In order to be able to produce the component to be manufactured in a layer-by-layer manner, the resin vat comprises a base which is transparent at least in sections. The resin accommodated in the resin vat can thus be locally irradiated, and thereby cured, by a radiation source (e.g. a DLP (Digital Light Processing) projector or a laser) disposed underneath the base of the resin vat. The basic structure of an additive manufacturing device, in particular a stereolithography machine, with a base which is transparent at least in sections is known to a person skilled in the art, which is why further details regarding the arrangement and control of the radiation source and the height-adjustable build platform do not have to be discussed here. The resin vat is connected to a holder for a reservoir. The resin vat can in particular be connected to the holder for the reservoir in a releasable or non-releasable manner. The reservoir serves to accommodate the resin from which the component to be manufactured is formed or generally produced in the additive manufacturing device. The holder is configured such that resin emerging from an outlet of a reservoir held from the holder can flow into the resin vat. The holder can be designed as a mechanical holder, for example, and for this purpose comprise a clamping device, such as a retaining clip, to clamp the reservoir in place, or a plug and socket device to insert the reservoir, or a receptacle (e.g. a shaft, for example in the form of a sliding frame) for a reservoir. Alternatively or additionally, the holder can be designed as a magnetic holder, which exerts a magnetic force on a likewise magnetic or magnetically attractable reservoir. At least when the reservoir is releasable from the holder, the holder can be designed to only partially enclose a held reservoir, at least temporarily, in order to keep an outlet of the reservoir clear, or at least temporarily unblock said outlet. The holder allows an at least temporary connection of the resin vat to a reservoir, so that the two parts can be handled as one unit, for example changed over as one unit. This makes a simple and quick changeover of an additive manufacturing device for printing with different printing materials (in respective separate material units) possible. In particular the effort for cleaning the additive manufacturing device prior to the use of a different printing material can be reduced. Within the scope of the present disclosure, the holder and the reservoir may also be formed as an integral component connected to the resin vat.

When the terms above, below, over, underneath or other position and direction specifications are used within the framework of this disclosure, these terms or specifications refer to a use position of the material unit or the additive manufacturing device. In this use position, the plane of the two largest extensions of the resin vat is disposed substantially horizontally.

According to an exemplary embodiment of the present invention, the holder holds a reservoir and the material unit along with the resin vat and the reservoir is equipped to be removably disposed in an additive manufacturing device. The material unit, which in this variant comprises the resin vat and the reservoir, can thus be replaced with a different material unit, which likewise comprises a resin vat and a reservoir, via simple removal from the additive manufacturing device. To do this, the other material unit, in particular for producing a component from another material, is inserted into the additive manufacturing device. However, even the mere removal of the material unit from the additive manufacturing device to store the material unit is thereby simplified. If the holder holds the reservoir in a releasable manner, i.e. interchangeably, an empty reservoir can easily be replaced with a different full or partially filled reservoir (e.g. with a resin having the same properties as before in the empty reservoir) without having to replace the entire material unit. It is advantageous if the holder is designed for a tool-free connection to the reservoir and a tool-free detachment from the reservoir.

If the holder and/or the reservoir is/are designed to cover the resin vat, the material unit can be closed easily and quickly when it is not being used. In the closed state, the material unit can also be used to store the resin enclosed in the resin vat and, if applicable, in a reservoir. The holder and/or the reservoir can in particular be designed in one piece with a vat cover, for example integrated into a vat cover. In this case, the reservoir can be inserted into the vat cover which is designed as the holder and held in it. The holder and/or the reservoir are optionally designed to cover the resin vat in an odor proof and/or UV-safe and/or substantially liquid-tight manner. For this purpose, the holder and/or the reservoir, for example, comprise a seal on the side facing the resin vat.

In order to be able to usefully position the holder and/or the reservoir in relation to the resin vat, it is beneficial if the holder and/or the reservoir is/are connected to the resin vat in a movable manner. As a result, the holder and/or the reservoir can take a different position in a stored state, i.e. a non-use state, of the material unit than in a state of use.

It is particularly advantageous, if the connection comprises a pivot joint between the resin vat and the holder and/or the reservoir. The holder and/or the reservoir accommodated in the holder can thus be pivoted or folded out and in, in relation to the resin vat.

It can in particular be provided that the holder and/or the reservoir can be pivoted in an angle range between an arrangement which is substantially parallel and at least one arrangement which is substantially perpendicular with respect to the resin vat. The resin vat can thus be closed or covered, by pivoting the holder and/or the reservoir accommodated in the holder into the arrangement which is substantially parallel to the resin vat. If, on the other hand, the holder and/or the reservoir accommodated therein is pivoted into the at least one arrangement which is substantially perpendicular with respect to the resin vat, the height of a build platform above the resin vat can be adjusted freely and said build platform dipped into the resin vat, in order to form a new material layer on the build platform or on the last-formed material layer. The holder and/or the reservoir are thus preferably configured to be pivotable in an angle range between 0° (parallel) and at least 90°.

According to a further embodiment of the invention, it can be provided that at least one flow obstruction is disposed in the interior of the reservoir. On the one hand, the flow obstruction serves to mix the resin contained in the reservoir, whereby the components in the resin can be evenly distributed in the volume of resin contained in the reservoir. On the other hand, the flow obstruction serves to condition the resin, i.e. establish a substantially uniform temperature of the resin contained in the reservoir. Both the mixing and conditioning of the resin can affect the manufacturing process of the component to be manufactured, and thus the properties of the manufactured component, significantly. For the mixing and conditioning of the resin, the holder and/or the reservoir accommodated therein can be moved relative to the resin vat. For example, the holder and/or the reservoir are pivoted several times relative to the resin vat. The flow obstruction can comprise at least one body provided in the reservoir, e.g. slats, bars or any projections projecting from the inner wall of the reservoir.

For a secure and easy accommodation of the reservoir in the holder, it is beneficial if the holder comprises a shaft for the accommodation of a replaceable cartridge as a reservoir. The reservoir designed as a cartridge can thus be inserted into the shaft of the holder and removed from the shaft again as needed. To hold the cartridge securely and releasably in the shaft, the shaft and the cartridge preferably comprise interacting components of a fixation device, e.g. a snap connection.

For resin to flow from the reservoir into the resin vat in a targeted manner, it is beneficial if the holder comprises an actuating device for actuating a valve of a reservoir held in said holder. The actuating device can be designed as a valve tappet, for example, that is configured to act on the valve (e.g. on a shut-off element, such as a membrane). The valve can be opened and closed by means of the actuating device for the metered removal of resin from the reservoir.

The resin contained in the reservoir can be removed particularly easily via the valve if the actuating device actuates the valve during a pivoting movement over a limit angle, wherein the limit angle corresponds to a substantially perpendicular arrangement of the holder and/or the reservoir in relation to the resin vat. The resin can thus be released by pivoting the holder or the reservoir accommodated therein in relation to the resin vat by a limit angle. The limit angle is more than 90°, for example, preferably at least 95°. The actuating device is further preferably configured to close the valve of the reservoir again (i.e. actively close and/or permit a self-closing of the valve) by pivoting the holder or the reservoir accommodated therein back to an angle that is smaller than the limit angle, e.g. at most 90°.

It is particularly beneficial if the holder is connected to a connection for a metering control, wherein a flow of resin from a reservoir held by the holder into the resin vat can be controlled via the connection. The metering control can be connected to the connection to control the discharge of resin from the reservoir.

For a particularly simple construction of the material unit, the connection can be a mechanical connection. The mechanical connection can be formed at a location accessible from outside the material unit for engagement with the metering control. The mechanical connection can, for example, be designed to be rotatable and comprise a gearing. In that case, the metering control can engage with the mechanical connection and rotate it between a first position, in which the discharge of resin from the reservoir is blocked, and a second position, in which the discharge of resin from the reservoir is enabled. The mechanical connection can be provided on the holder, for example, or coupled to the holder, so that a pivoting movement of the holder and/or the reservoir is enabled via the connection.

If the material unit comprises at least one guide for positioning in an additive manufacturing device, the material unit can be incorporated precisely and quickly in the additive manufacturing device. The additive manufacturing device expediently comprises at least one complementary guide which interacts with the guide of the material unit. The guides of the material unit and the additive manufacturing device can, for example, comprise form-fitted interfaces, e.g. guide grooves and guide rails that engage in said guide grooves. A final securing of the material unit against displacement can be realized both by means of a form fit and by means of a force fit. A precise and secure positioning of the material unit, e.g. relative to a build platform, promotes optimal resin use and helps prevent collisions during a printing process.

In order to easily be able to determine the fill level of the resin in the resin vat, it can be provided that the resin vat is equipped with a fill level sensor. In order to be able to display the fill level to an operator of the additive manufacturing device and/or to be able to derive further measures from the value of the fill level determined by the fill level sensor, the fill level sensor can be connected to a display device or a processing unit comprising a display device via a cable wirelessly. Resin from the reservoir can in particular be added to the resin vat if the fill level sensor indicates a defined minimum fill level, or indicates that the fill level is below the minimum fill level.

Alternatively, the resin vat can comprise a fill level sensor reading area for a capacitive fill level measurement. In this case, a capacitive fill level sensor provided in the manufacturing device can read a fill level of the resin vat in the fill level sensor reading area. For this purpose, the fill level sensor reading area is configured for reading the fill level with the capacitive fill level sensor. For the capacitive filling level measurement, in a similar manner to a plate capacitor, for example, at least two electrically conductive bodies (layers) are separated from one another via an electrically insulating layer. The capacitance recorded with the capacitive fill level sensor is a function of the size of the surface of the electrically conductive bodies, the distance and the material between the electrically conductive bodies. The resin accommodated in the resin vat preferably forms one of the electrically conductive bodies, while at least one electrically conductive plate or film of the capacitive fill level sensor forms the at least one other body. As the height of the resin in the resin vat increases, the electrically conductive surface, which is formed by the resin and faces the electrically conductive plate or film, increases. Electrical circuits or measuring devices for determining the capacitance of an arrangement consisting of two electrically conductive bodies (layers) facing one another are known to a person skilled in the art.

It is particularly advantageous, if a wall section of the resin vat in the fill level sensor reading area is electrically insulating and optionally has a wall thickness that is reduced in relation to an adjoining wall section. The wall section of the resin vat in the fill level sensor reading area can thus form the electrically insulating layer (dielectric) between the resin and the electrically conductive plate or film. In this case, the electrically conductive plate or film is mounted on the wall section of the resin vat in the fill level sensor reading area, for example. The wall thickness of the wall section that is reduced in relation to an adjoining wall section increases the capacitance of the arrangement consisting of resin, capacitive fill level sensor and wall section, and thus also the accuracy of the measurement of the fill level. The resin vat can in principle also be made from an electrically conductive material (e.g. metal). In this case, the fill level sensor reading area can be formed by a wall section of an electrically insulating material, i.e. in the manner of an electrically insulating window in an otherwise electrically conductive resin vat wall.

According to a further embodiment of the present disclosure, it can be provided that the resin vat and/or the reservoir are electronically labeled (or identified). The resin vat and/or the reservoir can in particular comprise an electronic component or a chip for identification. The reservoir can thus easily be assigned to a suitable resin vat. The electronic labelling (or identification) can be accomplished wirelessly, e.g. using RFID (radio-frequency Identification) technology and/or NFC (near field communication) technology. If the electronic label comprises an electronic memory, a current fill level of the resin in the reservoir can be stored in said memory. In order to keep the value of the fill level current, the value of the fill level in the memory can be updated after each removal of resin from the reservoir. For this purpose it is beneficial if, with each removal process of resin from the reservoir, a defined quantity of resin is removed. Updating the value of the fill level would then basically require the counting of the removal processes. Prior to the start of the manufacturing process, therefore, an operator of the additive manufacturing device already knows whether the quantity of resin in the reservoir will be sufficient for the production of the planned component.

It is particularly beneficial if the resin vat is equipped with a mixing device. The mixing device can in particular be integrated in the resin vat. The mixing device ensures a homogeneous temperature and particle distribution in the added resin, i.e. in the resin accommodated in the resin vat. Among other things, fillers or color pigments of the resin can be homogeneously distributed with the mixing device.

For a particularly efficient mixing of the resin accommodated in the resin vat, the mixing device can be movable in a translatory manner. The mixing device can be designed as a doctor blade, for example, and can be displaceable parallel to the vat base between two opposite walls of the resin vat.

In order to not have to provide a drive for the mixing device in the resin vat, the mixing device can be magnetically coupled to an external drive. The movement of the mixing device is thus forced by the drive provided outside the resin vat by means of magnetic force. A resin vat without an integrated drive for the mixing device is inexpensive to manufacture and is particularly robust.

The mixing device can alternatively be coupled to a drive integrated into the material unit, for example into the resin vat. The integrated drive comprises a displaceable rod, for example, which is connected to the mixing device. The integrated drive generally makes a particularly reliable movement of the mixing device possible.

In order to avoid or reduce repetitions, in the context of the following description of the method we also refer to the preceding description of the material unit in so far as it is applicable. In the context of the description of the material unit, we likewise refer to the following description of the method.

With regard to the method for preparing an additive manufacturing device for the use of a printing material contained in a reservoir, the present disclosure provides that a resin vat is inserted into the additive manufacturing device together with the reservoir, more specifically into a receptacle of the additive manufacturing device, wherein the resin vat comprises a base which is transparent at least in sections and wherein the reservoir is connected to the resin vat to form a material unit. The additive manufacturing device (or the receptacle thereof) and the material unit are thus designed and provided to be connected to one another. One and the same additive manufacturing device can thus be equipped with at least one of a number of different material units. The different material units can be provided for different defined manufacturing processes. In particular, at least one material unit can comprise a reservoir with a printing material that is suitable for applications in the field of dentistry, for example for the production of dental prostheses. Since the reservoir, which contains a defined printing material or is at least provided for said printing material, is connected to the resin vat to form a material unit, the resin vat is also provided for the manufacturing of a component with the defined printing material. Also in the context of the method, a printing material is a photoreactively curable material, in particular a material that can be cured by irradiation with light. Consequently, the terms printing material and resin have substantially the same meaning in the present disclosure. The additive manufacturing device can therefore be used for the production of components that are made from the printing material accommodated in the reservoir. For a consecutive production of components from different printing material, the additive manufacturing device is equipped with correspondingly suitable material units, without having to take a lot of time to clean the components of the material unit of the previously used printing material. The changeover procedure for the additive manufacturing device can be carried out particularly quickly because, instead of a separate handling of a reservoir and a resin vat, said resin vat and reservoir are connected to form a material unit. As previously described, a resin vat with a base which is transparent at least in sections is inserted into the additive manufacturing device (or in the receptacle provided for this purpose) as a part of the material unit for the local curing of the printing material. The printing material can thus be irradiated by a light source disposed underneath the material unit.

With regard to the method for conditioning a resin with a material unit as per the above description, it is provided according to the invention that the reservoir is moved relative to the resin vat, preferably periodically. To accomplish this, a holder that holds the reservoir and/or the reservoir itself is movably connected to the resin vat, e.g. via a pivot joint. It is also beneficial if a reservoir is used, which comprises at least one flow obstruction in its interior. The conditioning of the printing material or resin brings about a mixing of said printing material or resin, which is particularly beneficial after the resin has been stored for a long time, during which solids of the resin may have settled to the bottom of the reservoir. The movement of the reservoir with respect to the resin vat can be carried out manually by an operator of the additive manufacturing device or automatically. The preferably periodic movement of the reservoir relative to the resin vat is preferably carried out at least once prior to a first addition of resin from the reservoir into the resin vat.

It is particularly beneficial if the reservoir is pivoted relative to resin vat about a pivot axis. The holder and/or the reservoir can in particular be pivoted in an angle range between an arrangement which is substantially parallel and at least one arrangement which is substantially perpendicular with respect to the resin vat, e.g. in an angle range between 0° and at least 90°. The pivoting movement is preferably accomplished by means of a drive.

BRIEF DESCRIPTION OF THE DRAWINGS

The invention is explained in more detail in the following on the basis of preferred, non-limiting embodiments (hereinafter also referred to as examples) with reference to the drawings. The figures show:

FIG. 6 shows schematic illustrations of a resin vat configured for a capacitive fill level measurement, wherein FIG. 6a shows the resin vat with a capacitive fill level sensor, FIG. 6b shows a detail view of the capacitive fill level sensor, FIG. 6c shows an exemplary profile of the capacitance that can be recorded with the capacitive fill level sensor and FIG. 6d shows a side view of the resin vat onto the fill level sensor reading area with a wall section of reduced wall thickness.

DETAILED DESCRIPTION

Figure 1:
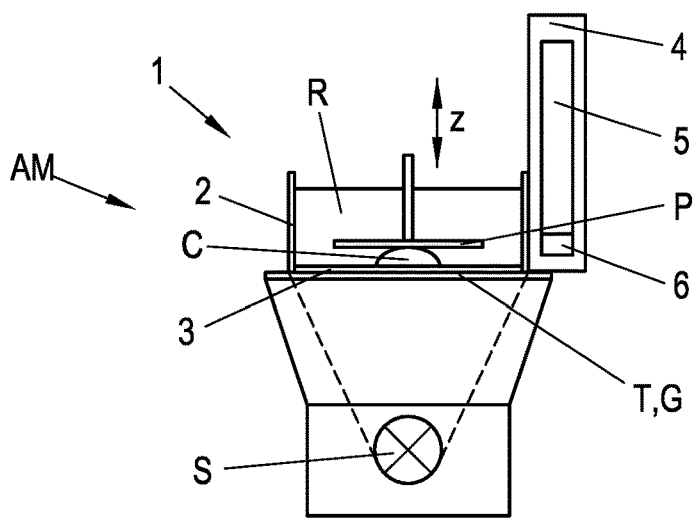
FIG. 1 shows a schematic illustration of an additive manufacturing device which is designed as a "bottom up" device for "overhead printing", which is equipped with a material unit according to one embodiment of the invention.

FIG. 1 shows an additive manufacturing device AM with a material unit 1 in a schematic illustration. In the example shown in FIG. 1, the additive manufacturing device AM is designed as a "bottom up" device for "overhead printing" and comprises, among other things, a light source S, e.g. a DLP (Digital Light Processing) projector or a laser, underneath the material unit 1. A transparent plate T, e.g. a glass plate G, is disposed above the light source S, preferably externally to material unit 1. The material unit 1 is then disposed above the transparent plate T. The material unit 1 comprises a resin vat 2, wherein the resin vat 2 comprises a base 3 (i.e. forming the vat bottom) which is transparent at least in sections. The transparent base 3 can, for example, be or comprise a transparent polypropylene film or Teflon film. The resin vat 2 is connected to a holder 4 for a reservoir 5. The holder 4 is configured such that resin R emerging from an outlet 6 of a reservoir 5 held by said holder 4 can flow into the resin vat 2. The resin R can flow out of reservoir 5 by force of gravity, for example.

As an example, in the resin vat 2, FIG. 1 further shows an at least partially manufactured component C that is formed layer-by-layer via selective irradiation on a (in z-direction) height-adjustable build platform P.

Figure 2:
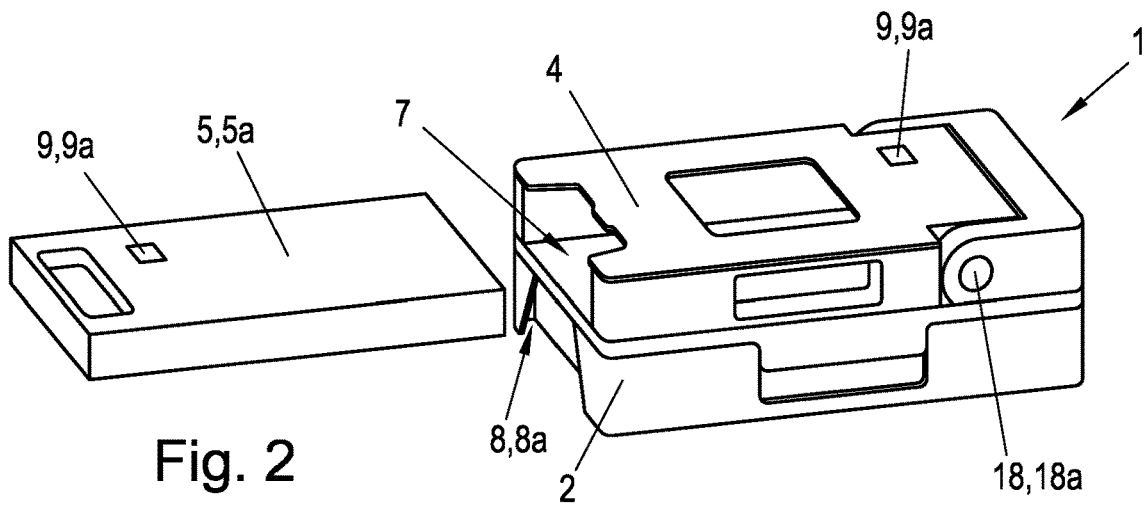
FIG. 2 shows the material unit according to a further embodiment of the invention, having a resin vat which is connected to a holder for a reservoir, in a stored state, and having a reservoir that is separate from the material unit.

FIG. 2 shows the material unit 1 according to the invention in a state in which it is detached or separate from the rest of the additive manufacturing device AM. The resin vat 2 and the connected holder 4 for a reservoir 5 are clearly identifiable. In the state shown in FIG. 2, the reservoir 5 is not inserted into the holder 4. In the example shown in FIG. 2, the holder 4 comprises a shaft 7 for the accommodation of a replaceable cartridge 5a as the reservoir 5.

Figure 3:
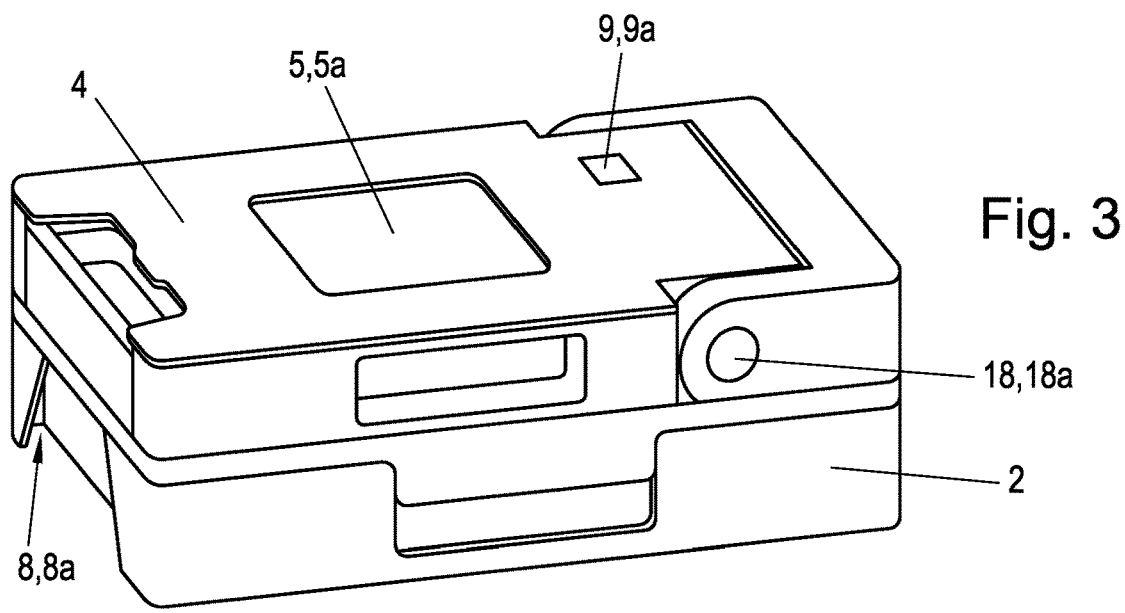
FIG. 3 shows the material unit of FIG. 2, wherein the holder holds the reservoir.

In contrast, FIG. 3 shows the material unit 1 in a state in which the reservoir 5 is inserted into the holder 4, i.e. the holder 4 holds the reservoir 5. The material unit 1 with the resin vat 2 and the reservoir 5 is configured for a removable placement in the additive manufacturing device AM. It can also be seen that the holder 4 and/or the reservoir 5 is/are designed for covering the resin vat 2. The holder 4 and/or the reservoir 5 consequently form a vat cover, or the holder 4 and/or the reservoir 5 are designed in one piece with an already existing vat cover not shown in FIG. 3.

In FIGS. 2 and 3 it can also be seen that the holder 4 and/or the reservoir 5 is/are connected to the resin vat 2 in a movable manner. The connection between the resin vat 2 and the holder 4 and/or the reservoir 5 comprises a pivot joint 18. The reservoir 5 can thus be pivoted relative to the resin vat 2 about a pivot axis 18a. The material unit 1 can further comprise at least one guide 8 for positioning in the additive manufacturing device AM. The guide 8 can be designed as a form-fitted interface, e.g. in the form of guide rails or in the form of recesses 8a, in which projections of the additive manufacturing device AM engage. The resin vat 4 and/or reservoir 5 can also be electronically identified by means of an electronic component 9, e.g. an RFID chip 9a.

FIGS. 2 and 3 show the material unit 1 in a closed state, i.e. a rest state or stored state in which the resin vat 2, the holder 4 and the reservoir 5 are folded together.

Figure 4:
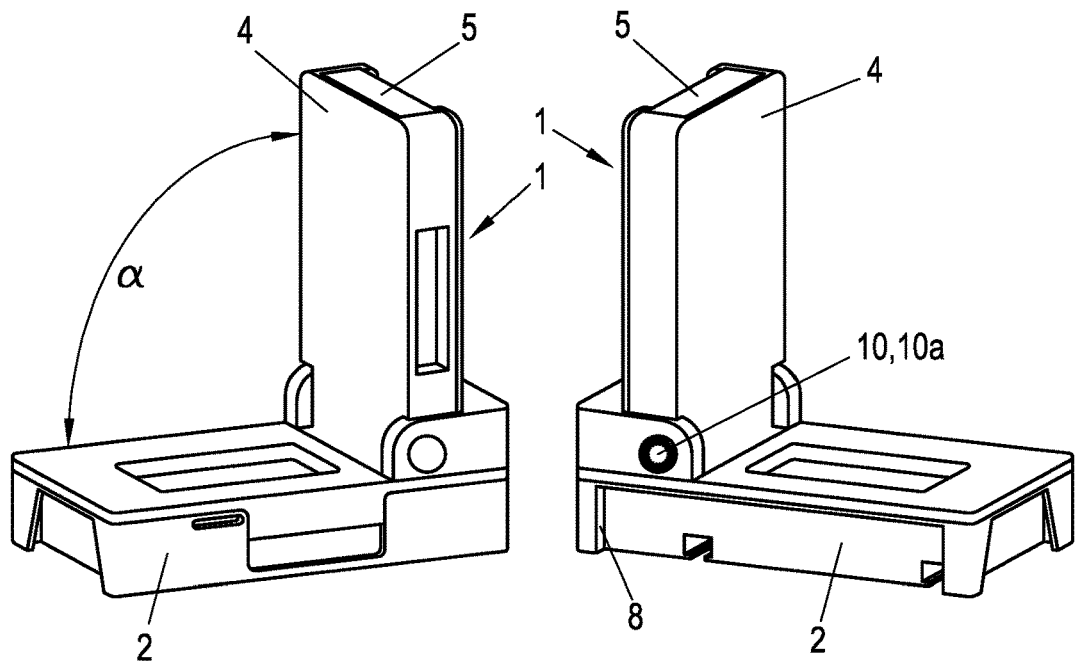
FIG. 4 shows two views of the material unit of FIG. 3 from two opposite directions in a state of use.

FIG. 4 shows two views of the material unit 1 from opposite directions in an open state, i.e. a state of use. A comparison with the stored state shown in FIGS. 2 and 3 shows that the holder 4 and/or the reservoir 5 can be pivoted about the pivot axis 18a in an angle range α between an arrangement which is substantially parallel and at least one arrangement which is substantially perpendicular with respect to the resin vat 2. The angle range α is preferably between 0° and at least 90°.

In the right image of FIG. 4, it can also be seen that the holder 4 is connected to a connection 10 for a not depicted metering control, wherein a flow of resin R from the reservoir 5 held by the holder 4 into the resin vat 2 can be controlled via the connection 10. In the example shown in FIG. 4, the connection 10 is a rotatable mechanical connection 10a. Because the metering control actuates the connection 10, e.g. engages in and rotates the connection 10 and thus rotates the holder 4, the otherwise closed outlet 6 of the reservoir 5 can be released, so that resin R flows out of the vertically disposed reservoir 5 into the resin vat 2. The resin R preferably flows out of the outlet 6 in the liquid state by force of gravity.

Figure 5:
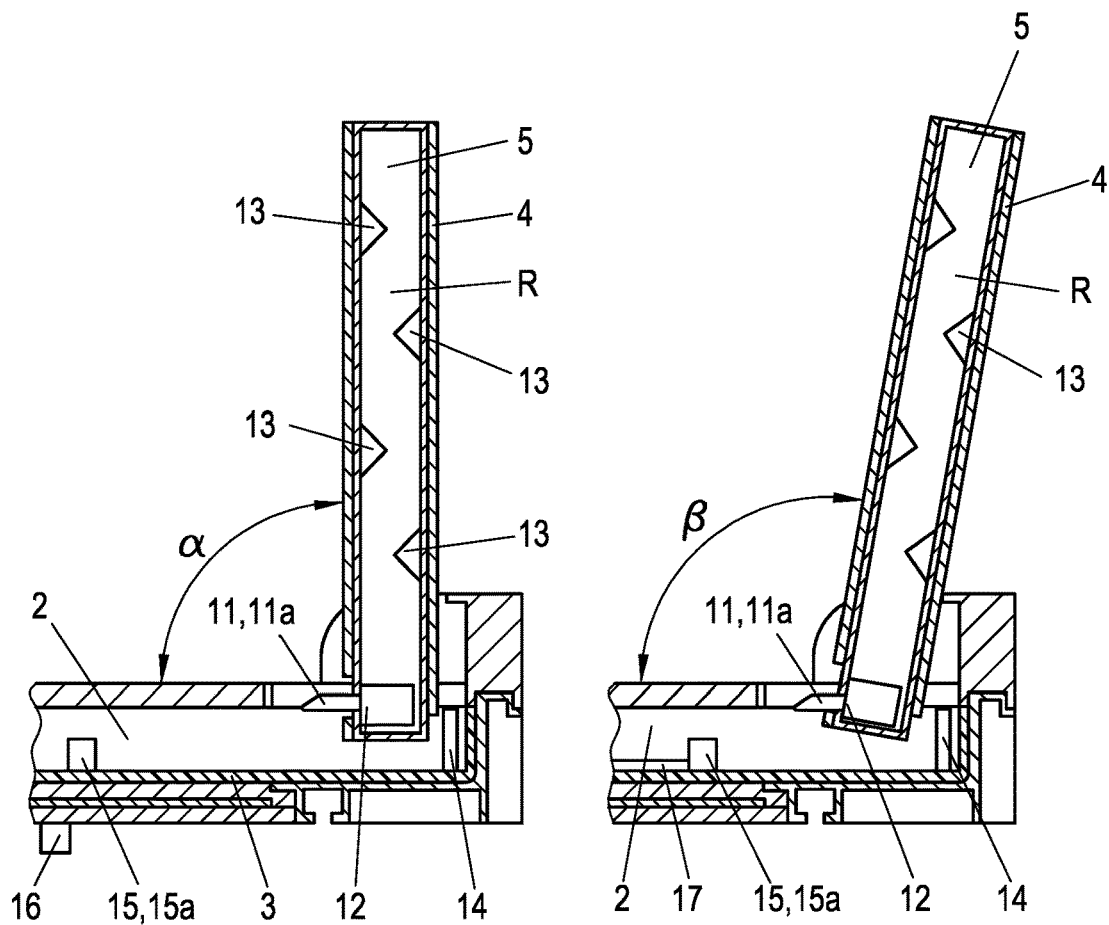
FIG. 5 shows two schematic illustrations of the material unit of FIG. 3 in a state of use, which show the reservoir in a sealing position and in a position allowing the discharge of resin.

FIG. 5 shows the material unit 1 in a state of use. In the left image, the holder 4 with the reservoir 5 is substantially perpendicular to the resin vat 2, i.e. at an angle α of 90°. In this state of the material unit 1, the outlet 6 of the reservoir 5 is closed. In the right image, the holder 4 with the reservoir 5 is disposed relative to the resin vat 2 at a limit angle β, which exceeds more than 90°, e.g. 95°. In this state of the material unit 1, the outlet 6 of the reservoir 5 is released to allow the discharge of the resin R. To discharge the resin R, the holder 4 comprises an actuating device 11, e.g. a valve tappet 11a, for actuating a valve 12 of the reservoir 5 accommodated in the holder 4. The actuating device 11 actuates the valve 12 during a pivoting movement of the holder 4 or the reservoir 5 over the limit angle β, wherein the limit angle β corresponds to a substantially perpendicular arrangement of the holder 4 and/or the reservoir 5 in relation to the resin vat 2, e.g. from 95°. The outlet 6 of the reservoir 5 is released by actuating the valve 12.

In FIG. 5 it can furthermore be seen that at least one flow obstruction 13 is disposed in the interior of the reservoir 5. The flow obstruction 13 can be designed as a projection, and serves to mix and condition the resin R accommodated in the reservoir 5 by pivoting, i.e. essentially shaking, the holder 4 with the reservoir 5, preferably several times. For the pivoting movement, a metering control can engage in the connection 10 shown in FIG. 4. FIG. 5 also shows a fill level sensor 14 with which the resin vat 2 is equipped. Therefore only the amount of liquid resin R required for the production of the component has to be metered into the resin vat 2.

FIG. 5 additionally shows that the resin vat 2 is equipped with a built-in mixing device 15, e.g. a doctor blade 15a. The mixing device 15 effects a homogeneous temperature and particle distribution in the resin R accommodated in the resin vat 2. The mixing device 15 can preferably be moved in a translatory manner. The mixing device 15 can in particular be movable on the base 3 of the resin vat 2 in a translatory manner. To drive the mixing device 15, said mixing device can be coupled magnetically to an external drive 16, an example of which is shown in the left image of FIG. 5. For this purpose, the external drive 16 and the mixing device 15 can be designed to be magnetic or magnetizable. The mixing device 15 can alternatively be coupled to a drive 17 integrated into the material unit 1, of which a part in the form of a drive rod is shown as an example in the right image of FIG. 5.

FIG. 6 shows schematic illustrations in connection with a resin vat 2 designed for a capacitive fill level measurement.

FIG. 6a in particular shows a resin vat 2, which comprises a fill level sensor reading area 19 for a capacitive fill level measurement. In the example shown, the fill level sensor reading area 19 is provided on the right side wall of the resin vat 2. A wall section 20 of the resin vat 2 in the fill level sensor reading area 19 is electrically insulating and preferably comprises a wall thickness that is reduced in relation to an adjoining wall section 21 (see FIG. 6d).

As can further be seen in FIG. 6a, a capacitive fill level sensor 22 is disposed on the exterior of the right side wall of the resin vat 2, which is electrically connected to a measuring device 23, which is in turn electrically connected to the resin R accommodated in the resin vat 2 (if necessary via a common defined reference potential). The resin R accommodated in the resin vat 2 represents an electrically conductive layer on the inner surface of the resin vat 2. The capacitive fill level sensor 22 comprises a circuit board with at least one plate or film 24 provided on it, for example, which is at least one electrically conductive layer. The wall section 20 with a reduced wall thickness in the fill level sensor reading area 19 of the resin vat 2 serves as a dielectric or as an insulation layer between the resin R and the plates or films 24.

FIG. 6b shows a detail view of the capacitive fill level sensor 22. In the example shown, the capacitive fill level sensor 22 comprises three plates or films 24 which are disposed on top of one another and are respectively electrically connected to the measuring device 23. As the height X of the resin R in the resin vat 2 increases, the electrically conductive surface that is formed by the resin and faces the capacitive fill level sensor 22, and with it the capacitance recorded with the capacitive fill level sensor 22 and the measuring device 23, increases as well.

FIG. 6c shows an exemplary correlation between the capacitance C recorded with the capacitive fill level sensor 22 and the height X of the resin R in the resin vat 2. It can be seen that the capacitance C in this example increases as the height X of the resin H increases, whereby X1 represents the upper edge of the lowest plate 24, X2 the upper edge of the middle plate 24 and X3 the upper edge of the top plate 24.

Instead of three plates or films 24, a single plate or film 24 could also be provided in a not depicted design example.

FIG. 6d shows a side view from the right onto the resin vat 2 shown in FIG. 6a. The fill level sensor reading area 19 with a wall section 20 having a wall thickness that is reduced in comparison to an adjoining wall section 21 is clearly visible. The wall section 20 is formed by a recess in the wall of the resin vat 2, for example.

In particular in the dental scope of application, an operator is faced with the task of having to change over additive manufacturing devices, e.g. stereolithography machines, for the use of a different printing material several times a day depending on the component to be manufactured. In known stereolithography machines, both the resin vat and the reservoir have to be exchanged for a changeover. The operator also has to ensure a UV-protected and odor proof storage of the reusable printing materials. If a "bottom up" device is changed over to a different printing material (resin), in particular the resin vat has to be removed,
the resin vat with the residual resin has to be stored in a UV-safe manner,
the reservoir has to be removed and stored,
the supply lines from the reservoir to the resin vat have to be cleaned,
another resin vat for the new material has to be inserted,
the reservoir with the desired other material may have to be shaken in order to mix settled resin components back in,
the reservoir with the desired other material has to be inserted,
the new resin vat has to be filled and, if necessary, brought to the right temperature, and
the resin in the new resin vat has to be stirred to mix it.

In known stereolithography machines, therefore, the resin vat and the reservoir are two devices that have to be handled separately, which forces the operator to take special care and ultimately causes considerable effort during the changeover.

In contrast, the material unit described above allows a simple changeover of the additive manufacturing device to a different printing material as well as a simple UV-safe and odor proof storage of the reusable residual materials. The operator only has to handle one unit, the material unit 1, to change the material. Material conditioning (i.e. mixing and bringing the resin H in reservoir 5 to the proper temperature) takes place in the material unit 1. For this step there are no further handling procedures for the operator. The additional metering of resin R during the manufacturing process can take place automatically without manual interaction on the part of the operator. As a self-contained unit, the material unit 1 can also be used for storing the enclosed printing material (resin R). The material unit 1 can facilitate changing over to and storing different printing materials, and also allow an automation of the conditioning and metering of the resin.

The invention claimed is:

1. A material unit for an additive manufacturing device (AM) having a resin vat and a reservoir, wherein the resin vat comprises a base which is transparent at least in sections, wherein the resin vat is connected to a holder for the reservoir, and wherein the holder is configured such that resin (R) emerging from an outlet of the reservoir held by said holder can flow into the resin vat, wherein the holder comprises an actuating device for actuating a valve of the reservoir accommodated therein, wherein the actuating device actuates the valve for a pivoting movement over a limit angle (β), wherein the limit angle (β) corresponds to a substantially perpendicular arrangement of the holder and/or the reservoir with respect to the resin vat.

2. The material unit according to claim 1, wherein the holder holds the reservoir and the material unit along with the resin vat and the reservoir is configured for a removable placement in an additive manufacturing device (AM).

3. The material unit according to claim 1, wherein the holder and/or the reservoir is/are designed for covering the resin vat.

4. The material unit according to claim 1, wherein the holder and/or the reservoir are connected to the resin vat in a movable manner.

5. The material unit according to claim 4, wherein the connection between the resin vat and the holder and/or the reservoir comprises a pivot joint.

6. The material unit according to claim 5, wherein the holder and/or the reservoir can be pivoted in an angle range (α) between an arrangement which is substantially parallel and at least one arrangement which is substantially perpendicular with respect to the resin vat.

7. The material unit according to claim 2 wherein at least one flow obstruction is disposed in the interior of the reservoir.

8. The material unit according to claim 1, wherein the holder comprises a shaft for accommodating a replaceable cartridge as a reservoir.

9. The material unit according to claim 1, wherein the holder is connected to a connection for a metering control, wherein a flow of resin (R) from a reservoir held by the holder into the resin vat can be controlled via the connection.

10. The material unit according to claim 9, wherein the connection is a mechanical connection.

11. The material unit according to claim 1, wherein the material unit comprises at least one guide for positioning in an additive manufacturing device (AM).

12. The material unit according to claim 1, wherein the resin vat is equipped with a fill level sensor.

13. The material unit according to claim 1, wherein the resin vat comprises a fill level sensor reading area for a capacitive fill level measurement.

14. The material unit according to claim 13, wherein a wall section of the resin vat is electrically insulating in the fill level sensor reading area and preferably has a wall thickness that is reduced in relation to an adjoining wall section.

15. The material unit according to claim 1, wherein the resin vat and/or the reservoir are electronically labeled.

16. The material unit according to claim 1, wherein the resin vat is equipped with a mixing device.

17. The material unit according to claim 16, wherein the mixing device can be moved in a translatory manner.

18. The material unit according to claim 17, wherein the mixing device is magnetically coupled to an external drive.

19. The material unit according to claim 18, wherein the mixing device is coupled to a drive integrated in the material unit.

20. A method for preparing an additive manufacturing device (AM) for the use of a printing material (R) contained in a reservoir, wherein a resin vat is introduced into the additive production device (AM) together with the reservoir, wherein the resin vat comprises a base which is transparent at least in sections and wherein the reservoir is connected to the resin vat to form a material unit according to claim 1.

21. A method for conditioning a resin (R) with a material unit according to claim 4, wherein the reservoir is moved relative to the resin vat, preferably periodically.

22. The method according to claim 21, wherein the reservoir is pivoted relative to the resin vat about a pivot axis.

\* \* \* \* \*